US005388034A

United States Patent [19]

Allen et al.

[11] Patent Number: 5,388,034

[45] Date of Patent: * Feb. 7, 1995

[54] VEHICLE HEADLAMP COMPRISING A DISCHARGE LAMP INCLUDING AN INNER ENVELOPE AND A SURROUNDING SHROUD

[75] Inventors: Gary R. Allen, Chesterland; L. Abigail Ainsworth, Cleveland Heights; John M. Davenport, Lyndhurst; Richard L. Hansler, Pepper Pike; Walter J. Kosmatka, Highland Heights, all of Ohio

[73] Assignee: General Electric Company, Schenectady, N.Y.

[ * ] Notice: The portion of the term of this patent subsequent to Oct. 12, 2010 has been disclaimed.

[21] Appl. No.: 945,768

[22] Filed: Sep. 16, 1992

[51] Int. Cl.⁶ ............ B60Q 1/04

[52] U.S. Cl. ............ 362/61; 362/263; 313/25

[58] Field of Search ............ 362/61, 263, 256, 310; 313/25, 113, 635

[56] References Cited

U.S. PATENT DOCUMENTS

| | | | |
|---|---|---|---|
| 2,843,778 | 7/1958 | Falge | 313/113 |
| 3,833,802 | 9/1974 | Fridrich | 362/263 |
| 4,891,541 | 1/1990 | Szekacs | 313/113 |
| 4,935,668 | 6/1990 | Hansler et al. | 315/82 |
| 4,990,819 | 2/1991 | Narby et al. | 313/25 |
| 5,016,150 | 5/1991 | Gordin et al. | 362/263 |
| 5,059,865 | 10/1991 | Bergman et al. | 313/25 |
| 5,099,168 | 3/1992 | Holten | 313/113 |
| 5,128,589 | 7/1992 | Dakin | 313/113 |
| 5,229,681 | 7/1993 | Gordin et al. | 313/113 |
| 5,253,153 | 10/1993 | Mathews et al. | 362/310 |

FOREIGN PATENT DOCUMENTS

| | | | |
|---|---|---|---|
| 0465083 | 1/1992 | European Pat. Off. | |
| 16959 | 5/1972 | Japan | 313/25 |
| 1097409 | 1/1968 | United Kingdom | 313/113 |
| 387468 | 10/1974 | U.S.S.R. | 313/113 |

OTHER PUBLICATIONS

EP-A-0465083 corresponds to pending U.S. Application Ser. No. 07/870,154 filed Apr. 19, 1992.

*Primary Examiner*—Ira S. Lazarus
*Assistant Examiner*—Y. Quach
*Attorney, Agent, or Firm*—George E. Hawranko; Stanley C. Corwin

[57] ABSTRACT

This headlamp comprises a reflector and a discharge lamp comprising an inner envelope having a longitudinal axis coinciding with the optical axis of the reflector. The inner envelope includes a bulbous portion, a front leg extending along the optical axis from the bulbous portion toward the front of the headlamp, and a back leg extending along the optical axis from the bulbous portion toward the reflector. The discharge lamp further comprises a tubular shroud comprising a first hollow portion surrounding the front leg of the inner envelope, a second hollow portion surrounding the back leg of the inner envelope, and a bulbous portion between the two hollow portions. The bulbous portion of the shroud has a central longitudinal axis, and this central axis is upwardly offset by a small distance (e.g., at least about 0.5 mm) from the longitudinal axis of the inner envelope on which the discharge is located. The presence of this offset has been found to substantially increase the ratio of the seeing light to the glare light (i.e., the SGR) in the headlamp beam as compared to that present when there is no offset between these axes.

6 Claims, 5 Drawing Sheets

10
38
39
62
56
50
68a
51
59
36
45
30
46
52
28
42
44
32
34
40
11
26
44
54
46
48
34
54
68
1(a)
1(a)
42
22
14
16
12
18
20

VEHICLE HEADLAMP COMPRISING A DISCHARGE LAMP INCLUDING AN INNER ENVELOPE AND A SURROUNDING SHROUD

BACKGROUND OF THE INVENTION

1. Field of the Invention

This invention relates to a vehicle headlamp having as its light source a discharge lamp, such as a metal-halide discharge lamp, comprising an inner envelope and a surrounding light-transmitting shroud joined to the inner envelope. The invention also relates to a discharge lamp per se of this type.

BACKGROUND OF THE DISCLOSURE

In European Patent Publication 465,083 published on Jan. 8, 1992 and U.S. Pat. No. 4,935,668—Hansler et al, there is disclosed and claimed a type of metal-halide lamp that comprises (i) a quartz inner envelope within which an electric discharge, or arc, is developed and (ii) a tubular glass or quartz shroud surrounding the inner envelope and spaced therefrom along a portion of the shroud length. Also disclosed and claimed in the referenced application and patent are vehicle headlamps containing metal-halide discharge lamps of this shrouded type. Typically, in the shrouded type of discharge lamp, the space between the tubular shroud and the inner envelope is sealed; but in some lamp designs, this space is left open, or unsealed.

In the case of the sealed-space design, the sealed space can be evacuated and can serve to make the operating temperature of the inner envelope higher and more uniform and also to keep the shroud relatively cool in comparison to the inner envelope. In both the sealed and unsealed designs, the shroud can be coated or formulated to provide for suppression of ultra-violet radiation in the light output from the discharge lamp.

One problem that arises in a vehicle headlamp when a shroud is introduced about the inner envelope is that the seeing-to-glare ratio (SGR) of the headlamp tends to be substantially reduced as compared to that of a corresponding headlamp without the shroud. This seeing-to-glare ratio is a measure of the headlamp's efficacy and is determined (i) by measuring with a goniometer the seeing and the glare components of the light emerging from the headlamp when the headlamp is set for low beam operation and (ii) then dividing the seeing component by the glare component. These seeing and glare components will be explained in more detail hereinafter.

One of our concerns is to reduce the extent to which the seeing-to-glare ratio is reduced by introduction of the shroud about the inner envelope of the discharge lamp.

SUMMARY OF THE INVENTION

The present invention relates to a shrouded lamp wherein the optical axis of the shroud is not coincident with the optical axis of the inner envelope containing the light source. In carrying out our invention in one form, we provide a headlamp comprising a reflector having an optical axis along which light is reflected from the reflector; and within the headlamp we provide a discharge lamp that comprises an inner envelope having a longitudinal axis substantially coinciding with said optical axis and upon which a discharge is developed during operation of the discharge lamp. The inner envelope includes a hollow bulbous portion and two tubular portions, or legs, extending in opposite directions from the bulbous portion. One of these tubular portions (i.e., a front tubular portion) extends along the optical axis of the reflector from the bulbous portion toward the front of the headlamp, and the other tubular portion (i.e., a back tubular portion) extends along the optical axis from the bulbous portion toward the reflector. The discharge lamp further comprises a tubular shroud surrounding the inner envelope and having first and second hollow portions at its opposite ends, with a bulbous portion located between said hollow portions, the first hollow portion surrounding the front tubular portion, or front leg, of the inner envelope, and the second hollow portion surrounding the back tubular portion, or back leg, of the inner envelope. The bulbous portion of the shroud has a central axis, and this central axis is upwardly offset by a small distance (e.g., at least about 0.5 mm) from the longitudinal axis of the inner envelope on which the discharge is located. The presence of this offset has been found to substantially increase the ratio of the seeing light to the glare light (i.e., the SGR) in the headlamp beam as compared to that present when there is no offset between these axes.

BRIEF DESCRIPTION OF THE DRAWINGS

For a better understanding of the invention, reference may be had to the following detailed description taken in connection with the accompanying drawings, wherein.

Figure 1:
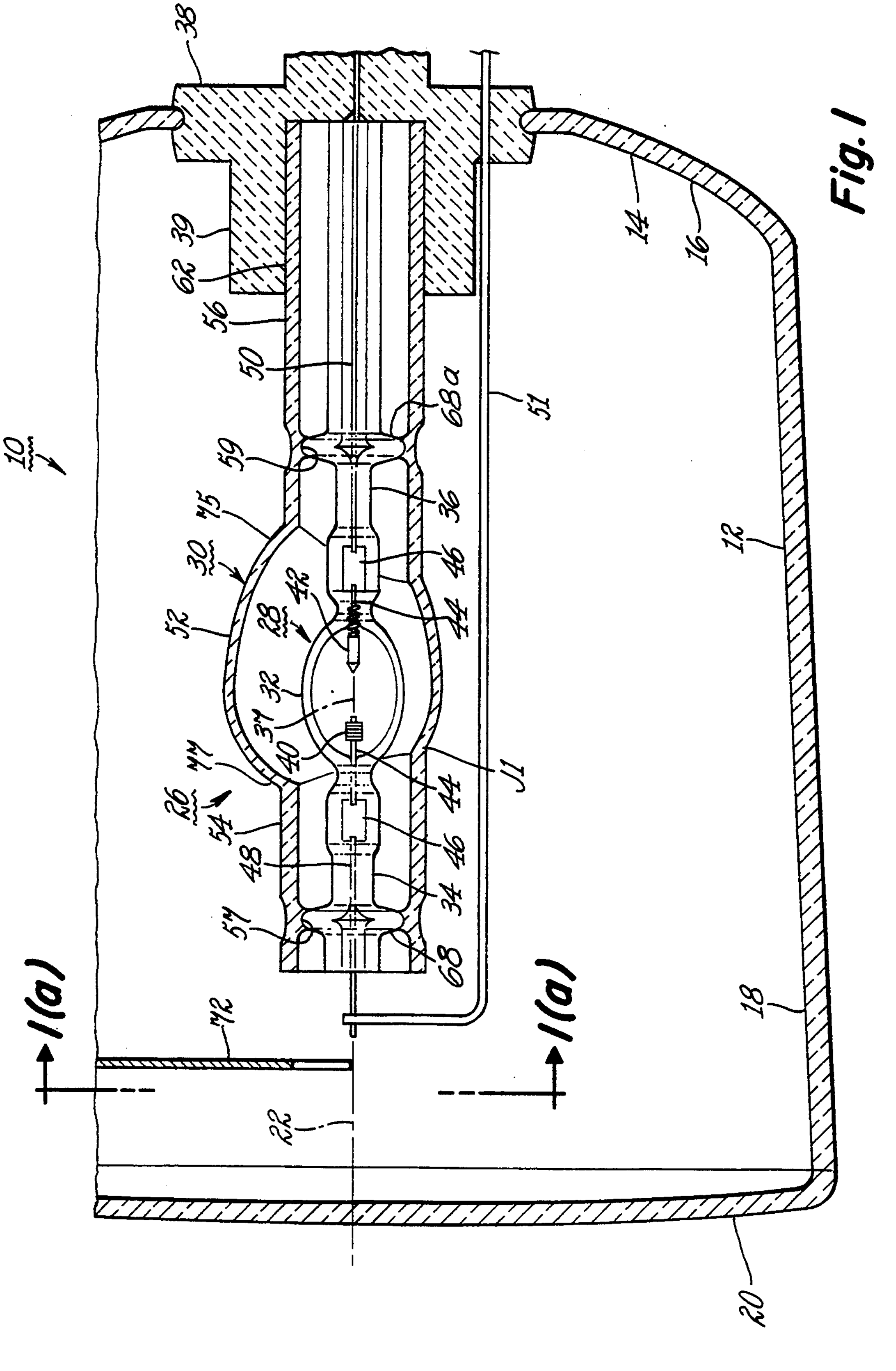
FIG. 1 is a sectional view of a vehicle headlamp embodying one form of the invention and having as its light source a metal-halide discharge lamp that includes an inner envelope and a surrounding shroud.

FIG. **1*a* is a reduced-size sectional view of the headlamp of FIG. 1 taken along the line 1*a*—1*a* of FIG. 1**.

Figure 2:
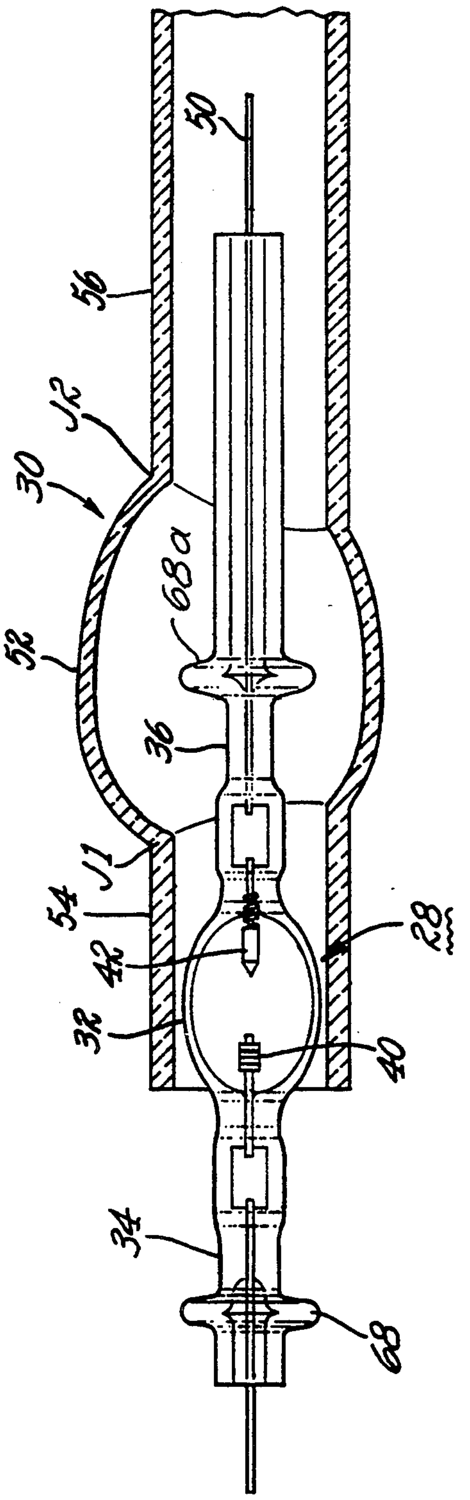

FIG. 2 is a simplified sectional view of the discharge lamp components while they are being assembled together and before being incorporated into the headlamp of FIG. 1.

Figure 3:
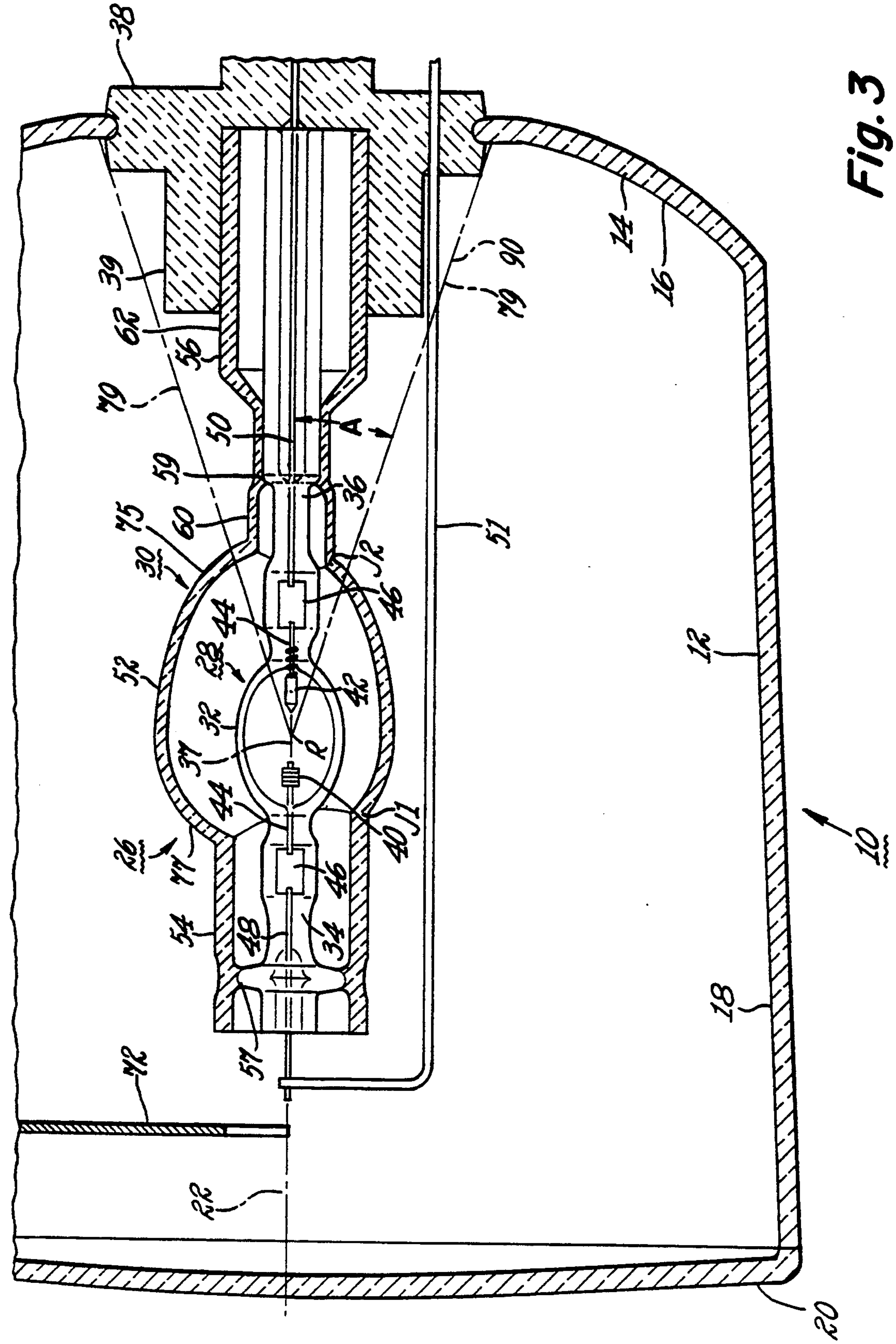

FIG. 3 is a sectional view, similar to FIG. 1, of a headlamp embodying a modified form of our invention.

Figure 4:
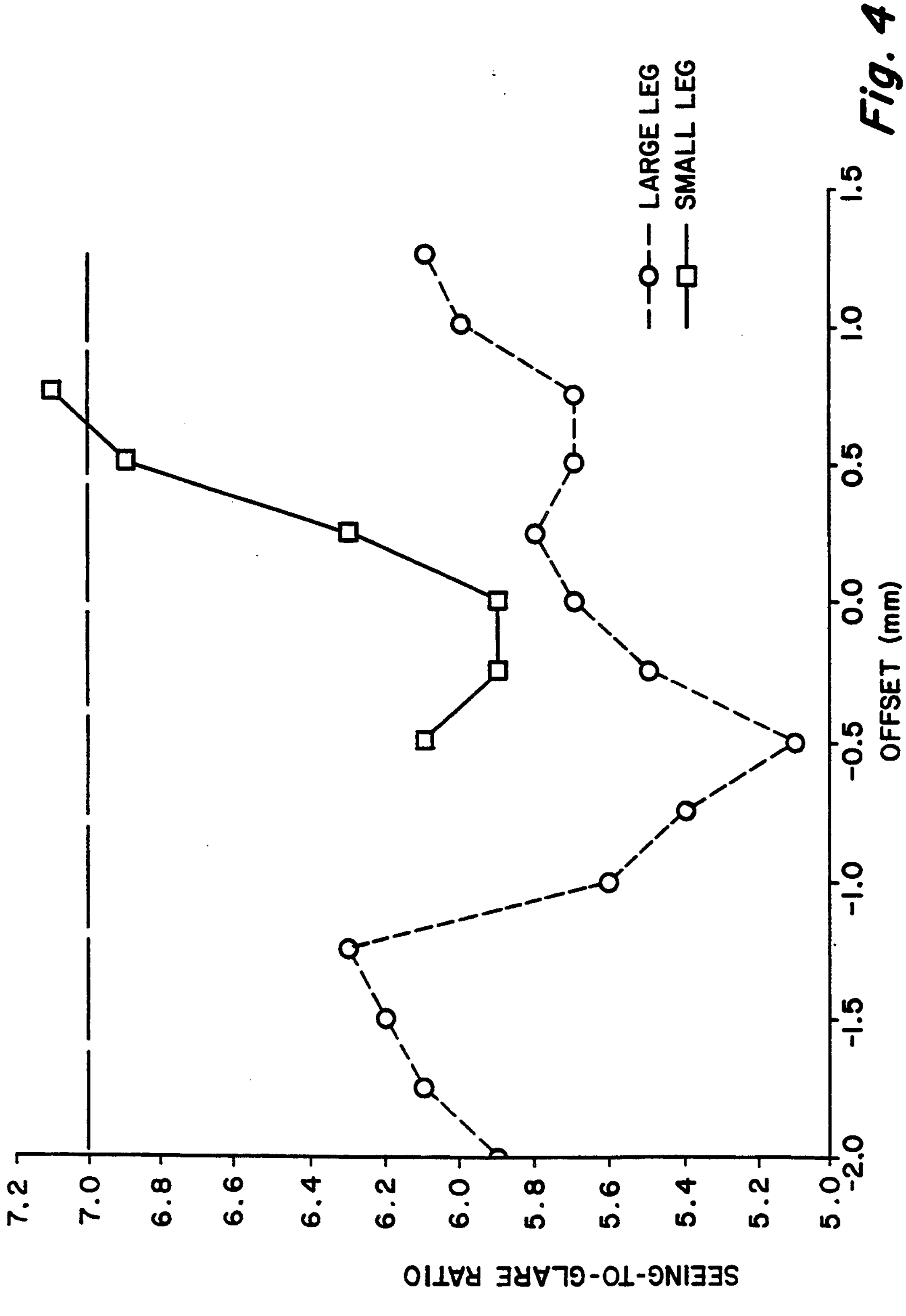

FIG. 4 is a graph that shows the effect on seeing-to glare ratio (SGR) of offsetting the central longitudinal axis of the bulbous portion of the shroud with respect to the central longitudinal axis of the inner envelope, where the discharge, or arc, is normally located during lamp operation. The top curve depicts results obtained using a discharge lamp corresponding to that illustrated herein in FIG. 3, and the lower curve depicts results obtained using a discharge lamp corresponding to that of FIG. 1. In neither case was there present a direct light shield, such as 72 of FIG. 1.

Figure 5:
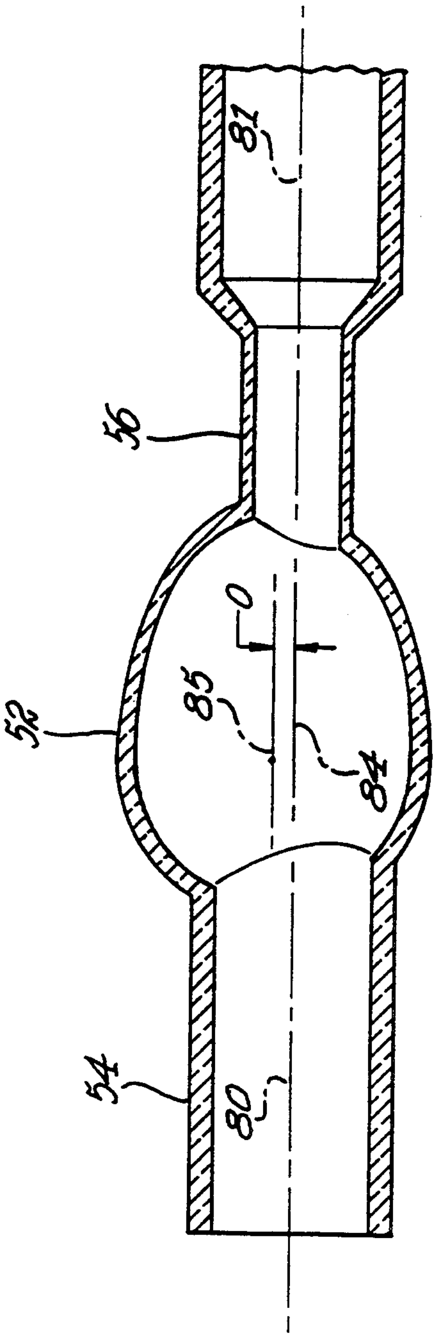

FIG. 5 is a simplified drawing of the shroud present in FIG. 3, taken alone and illustrating the offset relationship between the axis of the bulbous portion of the shroud and the axis of the hollow legs of the shroud.

DETAILED DESCRIPTION

Referring now to FIG. 1, there is shown a vehicle headlamp 10 that comprises a housing 12 comprising a reflector portion 14 having an internal reflective surface 16 preferably of paraboloidal configuration. The housing 12 further includes a portion 18 of generally rectangular cross-section at the front of the paraboloidal reflector 14. At the front of this rectangular portion 18 is a light-transmitting lens 20. The reflector 14 has an optical axis 22, parallel to which light generated within the lamp is reflected from the reflector to the lens 20, as will soon appear more clearly.

For generating such light, the headlamp includes a discharge lamp, such as a metal-halide discharge lamp 26, that comprises an inner envelope 28 and a tubular shroud 30 surrounding the inner envelope and integrally joined thereto. The inner envelope 28 and the shroud 30 are, preferably, both of quartz.

The inner envelope comprises a hollow bulbous central portion 32 and two tubular portions, or legs, 34 and 36 joined to and extending in opposite directions from the bulbous portion 32. The front tubular portion 34 extends along the optical axis 22 of the reflector from the bulbous portion toward the lens, and the back tubular portion 36 extends along the optical axis from the bulbous portion 32 toward the reflector 14. In the embodiment shown in FIG. 1, the inner envelope 28 has a central longitudinal axis 37 and is mounted within the housing 12 in such a position that this central longitudinal axis 37 substantially coincides with the optical axis 22 of the reflector. Central longitudinal axis 37 is sometimes referred to herein as the optical axis of the discharge lamp.

Within the bulbous portion 32 is a pair of spaced-apart electrodes 40 and 42 between which an electric discharge, or arc, extending along axis 37 is developed when the lamp is operated. As will soon appear more clearly, this discharge serves as the light source for the headlamp. The electrodes 40 and 42 respectively have rod portions 44 that extend along axis 37 into the adjacent tubular portions of the inner envelope, where they are supported on the quartz of the tubular portions. At the outer end of each rod portion 44 is a conventional foil seal that comprises a foil element 46 suitably joined at one end to the rod portion and joined at its opposite end to a lead wire (48 or 50) which extends through the associated tubular portion to an outer end of the inner envelope. Each of these foil seals is formed in a conventional manner, as by positioning it within its associated tubular leg (34 or 36) and heating and softening the surrounding quartz of the leg and suitably compressing this quartz about the foil element.

The tubular shroud 30 also has a bulbous central portion (52) and two hollow portions (54 and 56) at opposite sides thereof extending generally parallel to the optical axis 22 of the reflector. Hollow portion 54 of the shroud surrounds the tubular portion 34 of the inner envelope, and hollow portion 56 of the shroud surrounds the tubular portion 36 of the inner envelope. The shroud is radially spaced from the inner envelope along most of the shroud length and is sealed to the inner envelope at two spaced-apart locations 57 and 59. The space between the shroud and the inner envelope that is situated between the two seal locations 57 and 59 constitutes a sealed chamber, which in one embodiment is evacuated to a hard vacuum. As pointed out hereinabove, this evacuated chamber serves during lamp operation to make the temperature of the inner envelope higher and more uniform and also to keep the shroud relatively cool in comparison to the inner envelope. The shroud, if appropriately treated or formulated, can serve additional functions, such as ultra-violet radiation suppression.

Figure 1A:
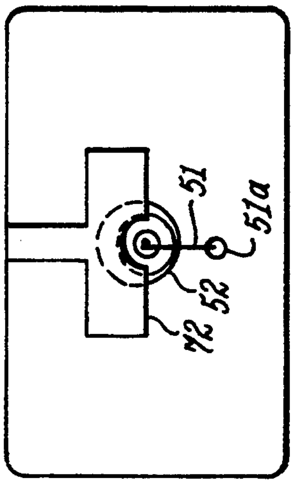

For supporting the discharge lamp 26 within the housing 18 in the position illustrated in FIG. 1, a centrally-located mounting device 38, preferably of a suitable high-temperature resistant polymer, is fitted within an opening in the reflector 14. This mounting device 38 includes a sleeve 39 that is concentric with optical axis 22 and tightly receives the end 62 of the tubular shroud portion 56, thus securely fixing the discharge lamp 26 to the reflector 14 in the desired position. One lead wire 50 of the discharge lamp extends in sealed relationship through the center of the mounting device to a first electrical terminal (not shown) outside the housing 12. Another wire 51 extends in sealed relationship through the mounting device 38 between a second external terminal (not shown) and the left hand end of the other lead wire 48 of the discharge lamp. The two wires 50 and 51 connect the discharge lamp in a suitable vehicle-lighting circuit in a conventional manner. In FIG. 1, to simplify the drawing, the wire 51 is shown located beneath the discharge lamp 26, but a preferred location for it is to one side of the discharge lamp as illustrated by the circle **51*a* in FIG. 1*a***.

The shroud 30 is formed separately from the inner envelope 28, preferably starting with quartz tubing having the same inner and outer diameters as the front hollow portion 54 and the back hollow portion 56 of the shroud. The bulbous central portion 52 of the shroud is preferably formed by heating and softening the original tubing in this region and then blowing this softened quartz radially outward into a mold having an internal configuration corresponding to the illustrated external configuration of the bulbous central portion. The original tubing, for the most part, is left intact to form the front and back hollow portions 54 and 56.

In FIG. 2, the inner envelope 28 and the separately-formed shroud 30 are shown while they are being joined together and before being incorporated into the headlamp. It will be noted that the tubular portion 34 of the inner envelope has a relatively large-diameter disk-shaped enlargement 68 formed therein. This enlargement 68, which is referred to herein as a large-diameter "maria," is formed by first heating a localized region of the quartz tubular portion 34 to its softening point and then subjecting this region to an abrupt, longitudinally-applied compressive force that drives the softened quartz radially outward into a disk formation of relatively large diameter. This method of formation is disclosed in more detail in European Patent Publication 465,083, cited hereinabove. When the shroud 30 is later slipped over the inner envelope 28, as shown in FIG. 2, the hollow front portion 54 of the shroud is ultimately positioned in alignment with the maria 68 in the position shown in FIG. 1. Only a very small radial clearance is then present between the outer periphery of the large-diameter maria 68 and the surrounding bore of the hollow shroud portion 54. Then the aligned hollow shroud portion is suitably heated and thus softened and caused to collapse about the outer periphery of the large-diameter maria, thereby forming the desired seal at 57 between the outer periphery and the surrounding shroud portion. A seal at the outer periphery of a maria, we refer to herein as a "maria seal."

The back leg 36 of the inner envelope also has a large-diameter disk-shaped maria (**68*a*) formed therein and joined at its outer periphery to the surrounding hollow portion (56) of the shroud. The back maria 68*a* is formed in substantially the same manner as the front maria 68** and is joined to the surrounding shroud portion in substantially the same manner as the front maria is joined to its surrounding shroud portion.

Light emitted by the discharge and passing through the maria seals or through the hollow portions 54 and 56 of the shroud tends to be scattered, and such scattering tends to increase the amount of glare present in the headlamp beam. For reducing such glare, there is provided at the front of the discharge lamp a black, or non-reflective, shield 72 that absorbs direct light from the discharge within the lamp, thereby blocking such direct light from exiting directly through the front of the headlamp in the region of the headlamp located above the optical axis 22 of the reflector. Accordingly, though direct light from the discharge may pass through the large-diameter maria seal and the hollow portion 54 of the shroud and thus be scattered by these parts, this does not significantly affect the amount of glare present in the headlamp beam because this direct light, being blocked and absorbed by the non-reflective shield 72, is basically not utilized in the headlamp beam. Through direct light from the discharge may pass through the portion of the large-diameter maria seal and shroud portion 54 located below the optical axis 22, with some resultant scattering, very little of this light will appear as glare in the headlamp beam. Most of this light exits the headlamp via its region below the optical axis 22 and is used to slightly increase the light on the roadway just ahead of the vehicle.

In the form of the invention shown in FIG. 1 the back zone 75 of the bulbous portion of the shroud is of a generally ellipsoidal configuration and, more specifically, an ellipsoidal configuration substantially conforming to a portion of the surface of an ellipsoid having its center near the inner envelope axis 37 and midway between the electrodes 40 and 42. The front zone 77 of the bulbous portion of the FIG. 1 shroud is formed of a generally spherical configuration and, more specifically, a spherical configuration substantially conforming to a portion of the surface of a sphere having its center near the inner envelope axis 37 and midway between the electrodes 40 and 42.

The reasons why these specific configurations have been utilized for the back and front zones of the bulbous portion of the shroud are explained in more detail in the aforesaid Mathews et al application, concurrently filed herewith. Such configurations are features forming a part of the Mathews et al invention and are specifically claimed in the Mathews et al application. The claims for the present application are not intended to be limited to these specific configurations.

Another form of our invention is illustrated in FIG. 3, which is similar to the FIG. 1 form of headlamp except that the shroud in the FIG. 3 form has a back hollow portion 56 which in the region adjacent the bulb 52 of the shroud is substantially smaller in diameter than the front hollow portion 54. In addition, the back hollow portion 56 is joined to the back leg 36 of the inner envelope by a different form of joint than is used in FIG. 1.

The shroud-to-inner envelope joint at the back of the discharge lamp comprises a seal 59, which we refer to as a low-profile seal. This low-profile seal 59 has a substantially smaller diameter than the large-diameter maria seal 57 at the front of the discharge lamp and is located much closer to the central axis 37 of the discharge lamp than the maria seal 57. This low-profile seal is made between the restricted region 60 of the back hollow portion 56 of the shroud and the tubular leg 36 of the inner envelope. This seal is made by heating, softening, and thereafter collapsing this restricted region about the tubular leg 36 in a conventional manner.

Partially because the rear shroud-to-inner envelope seal (at 59) is of relatively small diameter, it is located outside the path of most of the light transmitted from the discharge within the bulb 32 of the inner envelope to the reflector 14 and thus does not scatter or distort this light. Moreover, this reduced seal diameter allows the back zone 75 of the bulbous portion of the shroud to be extended further toward the central axis 37 of the inner envelope, allowing for a more nearly ideal shroud configuration in this region that permits light to be transmitted through the extended region without substantial scattering or distortion. Reference may be had to the aforesaid Mathews et al application for a fuller discussion of this feature.

Referring to FIG. 3, because the back hollow portion 56 of the shroud is of relatively small diameter in the region adjacent the bulb 52, the joint J2 between these parts 56 and 52 is located closer to the longitudinal axis 37 of the discharge lamp than is the joint J1 between the bulb 52 and the front hollow portion 54 of the shroud. For the same reason, joint J2 is located a greater distance along the discharge lamp axis 37 from a reference point R midway between electrodes 40 and 42 than the distance between junction J1 and reference point R.

Referring to FIG. 3, another significant feature with respect to the location of junction J2 is that J2 is located inside a conical reference envelope 79 generated by a reference line 90 revolved about the optical axis 37 of the discharge lamp 26. This reference line 90 is a straight line located below the optical axis 37, extending between the reference point R and the reflector and disposed at a minimum included angle A with respect to the optical axis 37 without intersecting the lamp-mounting structure 38. This location of junction J2 (i.e., inside conical reference envelope 79) results in substantially all light rays emitted by the discharge and traveling directly to the reflector 14 avoiding the junction J2, thus maintaining such rays essentially free of the glare component that would result if these rays were required to pass through junction J2.

One measure of a headlamp's efficacy is its seeing-to-glare ratio (SGR). This is determined by (i) measuring with a goniometer the seeing and the glare components of the light emerging from the headlamp when the headlamp is set for low-beam operation and (ii) then dividing the seeing component by the glare component. The seeing component refers to the light intensity (looking out from the headlamp) at a point located 0.5 degree below a horizontal reference line extending transversely of the headlamp at its optical axis and 1.5 degrees to the right of a vertical reference line extending transversely of the headlamp at the center of the roadway. The glare component refers to the maximum intensity along a horizontal line 0.5 degree up from the above-noted horizontal reference line.

We have studied this seeing-to-glare ratio (SGR) using as a test sample a headlamp having various discharge lamps present therein in the position and with the orientation shown in FIGS. 1 and 3. Our studies indicate (i) that a headlamp corresponding to that depicted but with no shroud present in the discharge lamp has an SGR of about 6.9 and (ii) that the addition of a shroud to the discharge lamp, as a general rule, substantially lowers the SGR of the headlamp. We also have found that the SGR is sensitive to the vertical offset of the axis of the bulbous portion 52 of the shroud from the central longitudinal axis 37 of the inner envelope. As one example, in a headlamp constructed substantially, as shown in FIG. 3, offsetting the axis of the bulbous portion of the shroud upwardly by 1.0 mm from a zero offset position has increased the SGR from about 6.0 to slightly above 7.0. As another example, when a shroud of the general configuration depicted in FIG. 1, i.e., with large diameter hollow portions at both ends of the lamp (to accommodate large-diameter marias on both legs of the inner envelope), was added to the unshrouded lamp, the SGR of the headlamp fell from 6.9 to about 5.7. Offsetting the central axis of that shroud upwardly by 1.0 mm increased the SGR to about 6.0. Smaller upward offsets produced smaller increases in SGR. FIG. 4 is a graph depicting these test results. The upper curve (designated the small leg curve) illustrates the performance of a headlamp using a discharge lamp including a shroud having the general shape and location illustrated in FIG. 3. The lower curve (designated the large leg curve) illustrates the performance of a headlamp using a discharge lamp including a shroud having the general shape and location depicted in FIG. 1 of the present application. In neither of these test series was there present a direct light shield, such as 72 in FIG. 1 hereof, the presence of such a shield being considered unnecessary to compare the SGR performance of the two headlamps. Also in neither of these test series was there present between the shroud and the inner envelope intervening support structure. The inner envelope was supported independently of the shroud to enable it to be moved independently of the shroud to effect different vertical offsets.

Summarizing our SGR findings, we have found that with the illustrated headlamps we can substantially improve the SGR of the headlamp if we offset in a vertically-upward direction the axis of the bulbous portion 52 of the shroud by about 0.5 to 1.5 mm. from the central axis 37 of the inner envelope. These results were obtained with a shroud having a bulbous portion with an outer diameter of about 14 mm. at its largest diameter location and with a paraboloidal reflector having a focal length of ⅞ inch.

In one form of the invention, we achieve the desired offset of the axis of the bulbous portion 52 of the shroud from the axis 37 of the inner envelope 28 by providing during the above-described shroud-molding process an offset between the central axis of the bulbous portion 52 and the central axis of the two hollow portions 54 and 56 of the shroud. As shown in FIG. 5, the axes of the two hollow portions, depicted at 80 and 81, are collinear and are disposed along a central reference line 84, but the axis of the bulbous portion, depicted at 85, is slightly offset in a vertically-upward direction from this central reference line 84. This offset 0 is achieved by appropriately shaping the mold that is used for forming the shroud 30.

The shroud is shaped so that the above-described central reference line 84 coincides with the central axis 37 of the inner envelope 28 when the shroud and inner envelope are combined. Thus, the hollow portions 54 and 56 of the shroud are concentric with the respective legs 34 and 36 of the inner envelope.

Other modified forms of the invention are illustrated in FIGS. 5 and 6 of the aforesaid Mathews et al application, filed concurrently herewith, which application contains a detailed description of these modified forms and claims specific thereto.

While we have shown and described particular embodiments of our invention, it will be obvious to those skilled in the art that various changes and modifications may be made without departing from the invention in its broader aspects; and we, therefore, intend herein to cover all such changes and modifications as fall within the true spirit and scope of our invention.

What is claimed is:

1. In a vehicle headlamp comprising a reflector having an optical axis along which light is reflected from the reflector forwardly thereof, a lens at a front end of the reflector for receiving and transmitting said reflected light, and a discharge lamp having an optical axis disposed substantially parallel to the optical axis of the reflector and mounted in a position between said reflector and said lens for generating said light, said discharge lamp comprising:

(a) an inner envelope comprising:

(a1) a hollow bulbous portion of vitreous light-transmitting material containing a fill, (a2) two tubular portions of vitreous material joined to and extending in opposite directions from said bulbous portion, a front one of said tubular portions extending along the lamp optical axis from said bulbous portion toward said lens and a back one of said tubular portions extending along the lamp optical axis from said bulbous portion toward said reflector, (b) a pair of spaced-apart electrodes within said bulbous portion of the inner envelope between which an electric discharge is developed substantially on the lamp optical axis when the lamp is operated, (c) means for supporting said electrodes on said tubular portions, (d) a tubular shroud of vitreous material surrounding said inner envelope and comprising first and second hollow portions at opposite ends of the shroud and a light-transmitting enlarged bulbous portion located between said hollow portions, the first of said hollow shroud portions surrounding said front tubular portion of the inner envelope, the second of said hollow shroud portions surrounding said back tubular portion of the inner envelope, and the bulbous portion of the shroud surrounding the bulbous portion of the inner envelope, and in which:

(e) said bulbous portion of the shroud has a central longitudinal axis that is parallel to and offset by a small distance vertically upward from said optical axis of the discharge lamp sufficient to substantially increase a first seeing-to-glare ratio of the headlamp as compared to a second seeing-to-glare ratio present in an otherwise identical headlamp having no offset between said central longitudinal axis of said bulbous portion and said optical axis of the discharge lamp, and (f) said enlarged bulbous portion of the shroud has a front zone surrounding said lamp optical axis and located adjacent said first hollow shroud portion and a back zone surrounding said lamp optical axis and located adjacent said second hollow shroud portion, (g) said front zone is joined to said first hollow portion through a first junction and said back zone is joined to said second hollow portion through a second junction, and (h) said second junction is located substantially closer to the lamp optical axis than said first junction.

2. The headlamp of claim 1 in which the amount of said vertical offset is sufficiently large as to increase said first seeing-to-glare ratio of the headlamp by at least 10 percent as compared to an otherwise identical headlamp with no vertical offset between the central longitudinal axis of the bulbous portion of the shroud and the optical axis of the discharge lamp.

3. A discharge lamp having an optical axis and comprising:

(a) an inner envelope comprising:

(a1) a hollow bulbous portion of vitreous light-transmitting material surrounding said optical axis and containing a fill, (a2) first and second tubular portions of vitreous material joined to and extending along said optical axis in opposite directions from said bulbous portion, (b) a pair of spaced-apart electrodes within said bulbous portion of the inner envelope between which an electric discharge is developed on said optical axis when the lamp is operated, (c) means for supporting said electrodes on said tubular portions, (d) a tubular shroud of vitreous material surrounding said inner envelope and comprising first and second hollow portions at opposite ends of the shroud and a light-transmitting enlarged bulbous portion located between said hollow portions, the first of said hollow shroud portions surrounding said first tubular portion of the inner envelope, the second of said hollow shroud portions surrounding said second tubular portion of the inner envelope, and the bulbous portion of the shroud surrounding the bulbous portion of the inner envelope, and in which:

(e) said bulbous portion of said shroud has a central longitudinal axis which is parallel to and vertically offset from said optical axis of said discharge lamp and said offset is effective so as to increase a seeing-to-glare ratio associated with said discharge lamp, (f) said enlarged bulbous portion of the shroud has a front zone surrounding said lamp optical axis and located adjacent said first hollow shroud portion and a back zone surrounding said lamp optical axis and located adjacent said second hollow shroud portion, (g) said front zone is joined to said first hollow portion through a first junction and said back zone is joined to said second hollow portion through a second junction, and (h) said second junction is located substantially closer to the lamp optical axis than said first junction.

4. The discharge lamp of claim 3 in which the amount of said vertical offset is sufficiently large as to increase the seeing-to-glare ratio by at least 10% in comparison to a discharge lamp having no vertical offset between said central longitudinal axis of said bulbous portion and said optical axis of said discharge lamp.

5. A lamp according to claim 3 in which said central longitudinal axis of said shroud is offset by a small distance vertically upward from said optical axis of said lamp sufficient to substantially increase the seeing-to-glare ratio of a vehicle headlamp incorporating the discharge lamp and including a reflector having an optical axis on which the optical axis of the discharge lamp is located as compared to the seeing-to-glare ratio of an otherwise identical headlamp in which there is no offset between the central longitudinal axis of the bulbous portion of the shroud and the optical axis of the discharge lamp.

6. In a vehicle headlamp comprising a reflector having an optical axis along which light is reflected from the reflector forwardly thereof, a lens at a front end of the reflector for receiving and transmitting said reflected light, and a discharge lamp having an optical axis disposed substantially parallel to the optical axis of the reflector and mounted in a position between said reflector and said lens for generating said light, said discharge lamp comprising:

(a) an inner envelope comprising:

(a1) a hollow bulbous portion of vitreous light-transmitting material containing a fill, (a2) two tubular portions of vitreous material joined to and extending in opposite directions from said bulbous portion, a front one of said tubular portions extending along the lamp optical axis from said bulbous portion toward said lens and a back one of said tubular portions extending along the lamp optical axis from said bulbous portion toward said reflector, (b) a pair of spaced-apart electrodes within said bulbous portion of the inner envelope between which an electric discharge is developed substantially on the lamp optical axis when the lamp is operated, (c) means for supporting said electrodes on said tubular portions, (d) a tubular shroud of vitreous material surrounding said inner envelope and comprising first and second hollow portions at opposite ends of the shroud and a light-transmitting enlarged bulbous portion located between said hollow portions, the first of said hollow shroud portions surrounding said front tubular portion of the inner envelope, the second of said hollow shroud portions surrounding said back tubular portion of the inner envelope, and the bulbous portion of the shroud surrounding the bulbous portion of the inner envelope, and in which:

(e) said bulbous portion of the shroud has a central longitudinal axis that is parallel to and offset by a small distance vertically upward from said optical axis of the discharge lamp sufficient to substantially increase a first seeing-to-glare ratio of the headlamp as compared to a second seeing-to-glare ratio present in an otherwise identical headlamp having no offset between said central longitudinal axis of said bulbous portion and said optical axis of the discharge lamp, (f) said enlarged bulbous portion of the shroud has a front zone surrounding said lamp optical axis and located adjacent said first hollow shroud portion and a back zone surrounding said lamp optical axis and located adjacent said second hollow shroud portion, (g) said front zone is joined to said first hollow portion through a first junction and said back zone is joined to said second hollow portion through a second junction, (h) a reference point is located on said lamp optical axis midway between said electrodes, (i) mounting structure for mounting said discharge lamp with respect to said reflector is provided within said reflector between said reflector and said discharge lamp, (j) a straight reference line can be constructed below said lamp optical axis from said reference point to said reflector that is disposed at a minimum included angle with respect to said lamp optical axis without intersecting said mounting structure, (k) a conical reference envelope is generable by revolving said reference line about said lamp optical axis, and (l) said second junction is located within said conical reference envelope.

* * * * *